Patented Dec. 12, 1922.

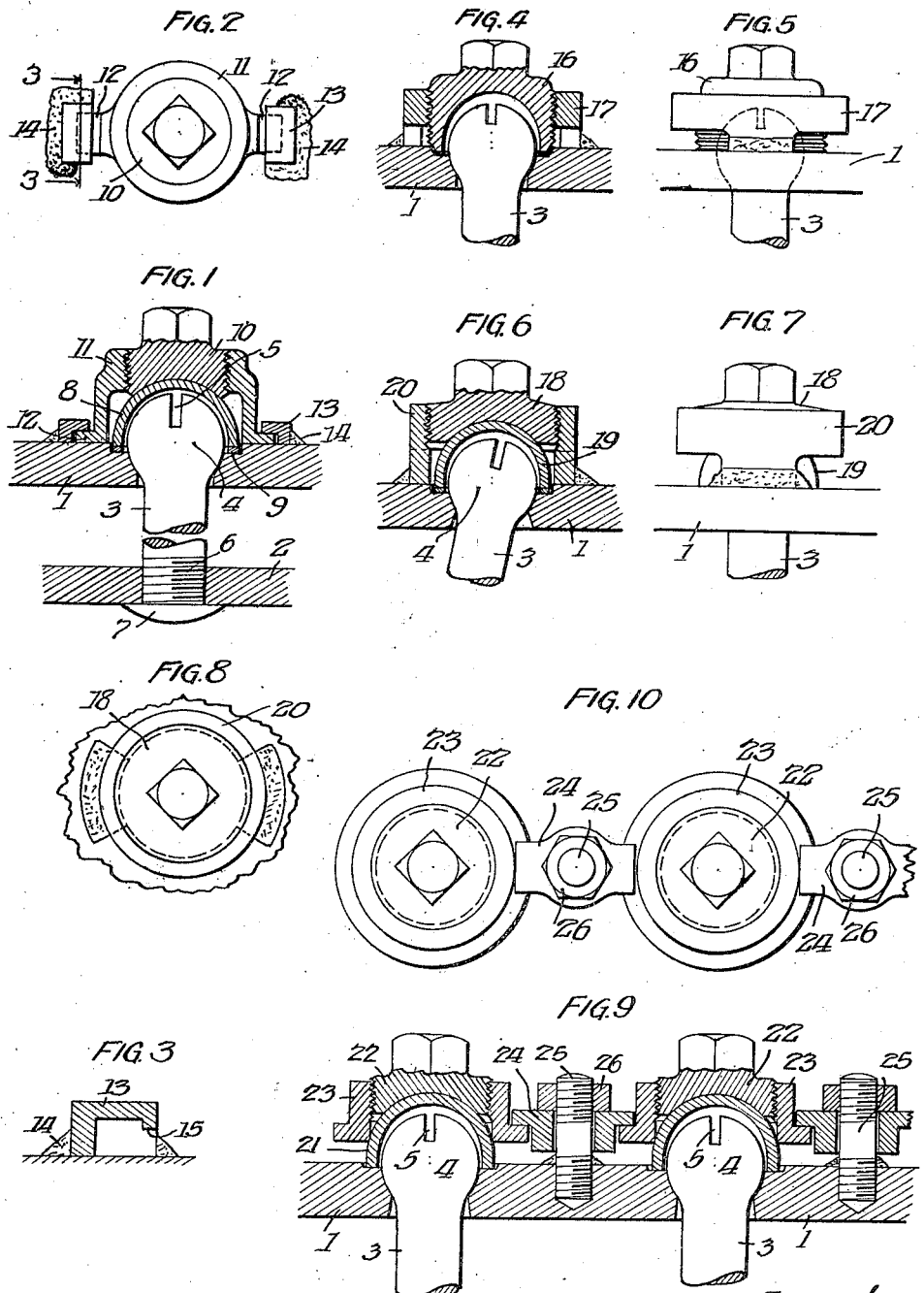

1,438,845

UNITED STATES PATENT OFFICE.

ROBERT S. MENNIE, OF CHICAGO, ILLINOIS.

STAY BOLT.

Application filed April 27, 1921. Serial No. 464,987.

*To all whom it may concern:*

Be it known that I, ROBERT S. MENNIE, a subject of the King of Great Britain, residing at Chicago, in the county of Cook and State of Illinois, have invented certain new and useful Improvements in Stay Bolts, of which the following is a specification.

My invention relates to improvements in staybolts.

One object of the invention is to provide a staybolt construction which maintains a steam-tight joint, but which permits rapid inspection of the head of the staybolt and ready renewal in case of breakage.

Another object is to attain certain of the advantages of a welded connection between the outer boiler wall and the cap which covers the head of the staybolt without welding as long a joint as is now necessary, and without exercising special care to make the joint steam-tight.

The use of staybolt caps or sleeves welded to the boiler wall is increasing rapidly, but requires a steam-tight welded joint completely surrounding the rim of the cap or of the sleeve to which the cap is secured. My improved construction does not require either a steam-tight or even a continuous welded joint, two or three short welded connections being sufficient.

In the accompanying drawings I have illustrated several embodiments of the invention.

Figure 1 is an elevation of a staybolt with parts of the structure in section;

Fig. 2 is a top plan view thereof;

Fig. 3 is a section on the line 3—3 of Fig. 2;

Fig. 4 is a sectional elevation of a modified form of the staybolt head enclosure;

Fig. 5 is a side elevation thereof;

Fig. 6 is a sectional elevation of a further modified staybolt head enclosure;

Fig. 7 is a side elevation thereof;

Fig. 8 is a top plan view thereof;

Fig. 9 is a sectional elevation of a further modification; and

Fig. 10 is a top plan view thereof.

In the first construction illustrated the outer boiler wall 1 is intended to illustrate the outer sheet of a locomotive boiler, 2 being the inner sheet. The outer and inner sheets have alined openings therein, through which the staybolt passes. Said staybolt has an enlarged head 4 at one end, which is preferably spherical in form, with a slot 5 therein whereby the staybolt may be rotated by means of a suitable tool, to cause the opposite screw-threaded end 6 to pass through a correspondingly screw-threaded opening in the inner sheet 2, after which the projecting inner end of the staybolt is upset to form an enlarged head 7, thus locking the staybolt in place.

The outer end of the staybolt is enclosed within a cap 8, which is preferably hemispherical in form and is seated in a slight recess in the boiler wall, resting on a gasket 9 therein. Said gasket is made preferably of copper and ensures a steam-tight joint, preventing the escape of such steam as may leak through the ball and socket joint formed by the head of the staybolt and its correspondingly shaped seat in the boiler wall. The cap 8 is clamped against the gasket by a plug 10 having screw-threaded engagement with a yoke 11. The lower end of the plug is concave and shaped to fit the spherical surface of the cap, thereby ensuring even pressure on the gasket and a tight joint at the rim of the cap, regardless of slight inaccuracies in the screw-threaded connection between the plug and the yoke, and regardless of the alinement of the axis of said plug with the longitudinal axis of the staybolt. The yoke has outwardly turned lugs 12, 12 at the end thereof, which slip beneath recessed members or clips 13 welded to the boiler wall by short welded joints 14, thereby forming, in effect, a bayonet catch, whereby the yoke may be readily removed or locked in place after properly loosening or tightening the plug 10. The welded joint 14 is made preferably by electric arc welding, although any suitable form of autogenous welding may be employed.

As shown in Fig. 3, the clips 13 have a slight flange 15 at the open end thereof, thereby providing a positive lock and also preventing disengagement of the ends 12 of the yoke after the plug has been tightened enough to lift said ends against the upper surfaces of the clip recesses and to press the cap 8 firmly down against the copper gasket. With the construction described, it will be apparent that the head of the bolt may be readily inspected by giving the plug a few turns with a wrench, after which the yoke may be turned and lifted from the clips and the cap 8 lifted to expose the head of the staybolt. If the staybolt is broken the outer end may be simply withdrawn and the inner end removed in the usual manner, after which a new bolt may be substituted and the cap again clamped in place.

In the form of invention shown in Figs. 4 and 5 the same reference numerals previously used have been applied to the corresponding parts. In this form, however, the plug itself is extended to form an enclosing cap 16, having screw-threaded engagement with a modified form of yoke 17, the latter being permanently welded to the boiler wall by short welds. The cap and plug are thus formed as one piece, and the staybolt may be inspected by simply unscrewing the nut from its yoke.

In Figs. 6, 7, and 8 a plug 18 and separate cap 19 are employed in conjunction with a yoke 20 welded to the boiler wall, but the plug, as in the preceding modification, is of a diameter sufficiently great to permit removal of the staybolt through the opening without removing the yoke. The staybolt may be inclined with reference to the boiler wall to meet special requirements.

In Figs. 9 and 10 a construction is provided wherein a plurality of staybolt caps may be held in place by a minimum number of welded connections with the boiler wall. The caps 21 are held in place by nuts 22, which engage flanged yokes 23, said yokes being held in place through the engagement of their flanges with a locking member 24, mounted on a stud 25 and adjustably held thereon by a nut 26. The stud may be either screw-threaded into the boiler wall or it may be welded thereto, or it may be held in part by screw threads and further secured by welding, if desired. In order to inspect a staybolt the inspector loosens one of the nuts 26, enabling the locking member to be given a quarter turn, thereby releasing the two adjacent yokes 23, either of which may then be tilted and lifted, thus permitting the cap 21 to be removed. Or, to facilitate the operations above described, two nuts 26 on opposite sides of a given yoke 23 may be loosened at the same time.

Welded staybolt caps or sleeves in use at the present time require not only a continuous welded joint entirely surrounding the cap or sleeve, but said welded joint is relied on to seal the enclosure and must therefore be steam-tight. If this welding is not done very carefully by a skilled operator, small pin holes may result, which permit leakage of steam and render the welded joint unsatisfactory. Properly made welded joints have great advantages, however, in that the enclosure is integrally united to the boiler wall, resulting not only in a very strong connection, but in a connection which does not decrease the initial strength of the boiler wall itself, as no metal is removed. In my present construction I obtain the benefit of a strong welded joint to hold the enclosure in place and resist the steam pressure, but do not rely on the welded connection to furnish the necessary steam-tight joint. For this reason the welding need not be performed as carefully, and considerable additional time and expense may be saved, in that the actual amount of welding is very much reduced.

The invention may be embodied in forms other than those illustrated herein. The gasket need not necessarily be employed, if the cap rim and its seat are sufficiently accurate to ensure a tight joint. Also, in cases where the yoke is shown as welded in place, it may be held by studs or cap screws if desired, although the welding is much preferable. Various other changes may be made within the scope of the invention.

I claim:—

1. In a staybolt construction, a stay-bolt having a head, a boiler wall having an opening through which said staybolt passes, a cover cooperating with said boiler wall to provide a steam tight enclosure for the head of said staybolt, and means secured to said boiler wall by which said cover is held in position and from which it may be disengaged to permit inspection of the head of the bolt.

2. In combination, a boiler comprising a pair of walls having alined openings therein, staybolts passing through said openings and having an enlarged head at each end preventing separation of said walls, one of said heads having a spherical zone forming a ball and socket joint with its seat, a cap enclosing said head, a gasket between said cap and one of the boiler walls to provide a steam-tight connection, and securing means welded to said boiler wall, said cap having screw-threaded means associated therewith whereby it may be clamped in position or removed.

3. In a staybolt construction, a boiler wall having an opening with a spherical seat, a staybolt having a spherical head fitting said seat and having a recess surrounding said opening, a cap for said head enclosing the same and received within said recess, a gasket in said recess between said cap and the boiler wall, a yoke secured to said boiler wall and having an opening therein, and a plug within said opening having screw-threaded engagement with said yoke and bearing against said cap to maintain a steam-tight joint at said gasket but permitting removal of said cap for inspection purposes.

4. In a staybolt construction, a boiler wall having an opening therethrough with a spherical seat therein, a staybolt having an enlarged head fitting said seat to form a ball and socket joint, a cap enclosing said head, a plug bearing against said cap, a yoke holding said plug in place, and members welded to said boiler wall with which said yoke has detachable engagement.

5. In a staybolt construction, a boiler wall having an opening therein, a staybolt passing therethrough having a head, a spherical cap enclosing said head, a plug having a spherical recess fitting said cap, a yoke having screw-threaded engagement with said plug, and members welded to said boiler wall with which said yoke may engage or disengage by rotative movement.

6. In a staybolt construction, a staybolt having an enlarged head, a boiler wall having an opening through which said staybolt passes, a cap enclosing the head of said staybolt, and means secured to said boiler wall by a plurality of short welded joints for retaining said cap in position, said cap being adjustably associated with said means to permit tightening of said cap and ensure a steam-tight joint at the rim thereof and to permit removal of said cap for inspection of said staybolt, whereby the strength of the welded joints is available to resist the steam pressure and a steam-tight joint is obtained independently of said welded joints.

In testimony whereof, I have subscribed my name.

ROBERT S. MENNIE.